United States Patent
Cordle et al.

(10) Patent No.: US 11,589,603 B2
(45) Date of Patent: Feb. 28, 2023

(54) POWDERED NUTRITIONAL PRODUCT CONTAINING BRANCHED-CHAIN AMINO ACIDS AND A SUGAR ALCOHOL

(71) Applicant: Abbott Laboratories, Abbott Park, IL (US)

(72) Inventors: Christopher Cordle, Howard, OH (US); Roger Tyre, Canal Winchester, OH (US); Paul Johns, Columbus, OH (US); Sean Garvey, Columbus, OH (US); Eric Torgerson, Columbus, OH (US)

(73) Assignee: ABBOTT LABORATORIES, Abbott Park, IL (US)

( * ) Notice: Subject to any disclaimer, the term of this patent is extended or adjusted under 35 U.S.C. 154(b) by 247 days.

(21) Appl. No.: 15/758,518

(22) PCT Filed: Sep. 8, 2016

(86) PCT No.: PCT/US2016/050739
§ 371 (c)(1),
(2) Date: Mar. 8, 2018

(87) PCT Pub. No.: WO2017/044601
PCT Pub. Date: Mar. 16, 2017

(65) Prior Publication Data
US 2018/0255818 A1  Sep. 13, 2018

Related U.S. Application Data

(60) Provisional application No. 62/217,459, filed on Sep. 11, 2015.

(51) Int. Cl.
| | | |
|---|---|---|
| A23L 33/125 | (2016.01) | |
| A23L 2/39 | (2006.01) | |
| A23L 33/175 | (2016.01) | |
| A23L 33/18 | (2016.01) | |
| A23L 33/16 | (2016.01) | |

(52) U.S. Cl.
CPC .............. *A23L 33/125* (2016.08); *A23L 2/39* (2013.01); *A23L 33/16* (2016.08); *A23L 33/175* (2016.08); *A23L 33/18* (2016.08); *A23V 2002/00* (2013.01)

(58) Field of Classification Search
CPC ...... A23L 33/125; A23L 33/18; A23L 33/175; A23C 33/175
USPC ........................................................ 426/548
See application file for complete search history.

(56) References Cited

U.S. PATENT DOCUMENTS

| | | | |
|---|---|---|---|
| 2007/0116823 A1* | 5/2007 | Prakash | .................. A23L 2/60 |
| | | | 426/548 |
| 2007/0224265 A1* | 9/2007 | Hara | .................. A61K 9/2013 |
| | | | 424/464 |
| 2008/0305151 A1 | 12/2008 | Sakai et al. | |
| 2014/0294969 A1 | 10/2014 | Mcintosh et al. | |

FOREIGN PATENT DOCUMENTS

| | | |
|---|---|---|
| EP | 1221865 B1 | 3/2007 |
| JP | 2004339062 A | 12/2004 |
| JP | 3606724 B2 | 1/2005 |

OTHER PUBLICATIONS

Gekko, K., "Mechanism of Polyol-Induced Protein Stabilization: Solubility of Amino Acids and Diglycine in Aqueous Polyol Solutions," J. Biochem., 90, 1633-1641 (1981) (Year: 1981).*
Willett, Brian, Is Soy Protein Isolate Good or Bad?, Livestrong. com, https://www.livestrong.com/article/465783-is-soy-protein-isolate-good-or-bad/, pp. 1-5 (Aug. 13, 2011).

* cited by examiner

*Primary Examiner* — Jeffrey P Mornhinweg
(74) *Attorney, Agent, or Firm* — Porter Wright Morris & Arthur LLP (57) ABSTRACT

Powdered nutritional products containing branched-chain amino acids and a sugar alcohol are provided. The branched-chain amino acids in the powdered nutritional product exhibit improved solubility and thus improved dissolution upon reconstitution of the powdered nutritional product.

30 Claims, 3 Drawing Sheets

POWDERED NUTRITIONAL PRODUCT CONTAINING BRANCHED-CHAIN AMINO ACIDS AND A SUGAR ALCOHOL

FIELD

The general inventive concepts relate to nutritional products. More particularly, the general inventive concepts relate to powdered nutritional products containing branched-chain amino acids and a sugar alcohol.

BACKGROUND

A common problem for many powdered nutritional products is the difficulty of reconstituting the powder in a liquid medium. Powdered forms of nutritional ingredients are often not able to be quickly and easily dissolved in a liquid, such as water. Powdered formulations of basic nutrient units can be especially resistant to dissolution in liquids. This is particularly true when the liquid is at or below room temperature (e.g., 20° C. to 25° C.). For example, many small peptides, such as dipeptides, tripeptides, tetrapeptides, and pentapeptides, as well as free amino acids are known to display poor dissolution properties in a liquid medium. This is particularly true for hydrophobic amino acids, such as the branched-chain amino acids leucine, isoleucine, and valine.

The problem of poor dissolution has been addressed in the past by allowing for greater mixing time. However, the mixing time required to allow some ingredients of a powdered nutritional product to dissolve may be greater than 10 minutes, which greatly affects the convenience and desirability of the powdered product. The problem has also been addressed by attempting to reconstitute the powdered nutritional product with a hot liquid medium. This approach has several disadvantages including, for example, the possible reduction of nutritional value of the product due to heat degradation; the frequent desire of consumers for a chilled beverage, especially during and after exercise; and the requirement that a heating source be readily available. In addition, using a hot liquid medium to reconstitute a powdered nutritional product may also represent a safety concern (e.g., a heightened burn risk).

In view of the above, there remains a need for powdered nutritional products that exhibit improved dissolution in a liquid medium (even at or below room temperature) to permit fast, convenient, and safe consumption of the reconstituted powdered nutritional product.

SUMMARY

The general inventive concepts relate to a powdered nutritional product comprising branched-chain amino acids and a sugar alcohol. It has been found that the branched-chain amino acids in the powdered nutritional products according to the present disclosure exhibit improved solubility and thus improved dissolution upon reconstitution of the powdered nutritional product. To illustrate various aspects of the general inventive concepts, several exemplary embodiments of powdered nutritional products are provided herein.

In one exemplary embodiment, a powdered nutritional product is provided. The powdered nutritional product comprises at least 15 wt. % of a branched-chain amino acid. The powdered nutritional product also comprises a sugar alcohol. A weight ratio of the branched-chain amino acid to the sugar alcohol is from 7:1 to 40:1.

In one exemplary embodiment, a powdered nutritional product is provided. The powdered nutritional product comprises at least 15 wt. % of an oligopeptide, wherein the oligopeptide comprises at least one branched-chain amino acid per oligopeptide molecule. The powdered nutritional product also comprises a sugar alcohol. A weight ratio of the oligopeptide comprising at least one branched-chain amino acid to the sugar alcohol is from 7:1 to 40:1.

In certain exemplary embodiments, the sugar alcohol is at least one of an inositol isomer, xylitol, mannitol, sorbitol, galactitol, and erythritol. In certain exemplary embodiments, the sugar alcohol is myo-inositol.

In certain exemplary embodiments, the branched-chain amino acid is at least one of leucine, isoleucine, and valine. In certain exemplary embodiments, the branched-chain amino acid is in the form of a free amino acid, a salt, an oligopeptide, and combinations thereof. In certain exemplary embodiments, the oligopeptide is at least one of a dipeptide, a tripeptide, a tetrapeptide, and a pentapeptide, wherein the oligopeptide comprises at least one branched-chain amino acid per oligopeptide molecule.

DETAILED DESCRIPTION

While the general inventive concepts are susceptible of embodiment in many different forms, described herein in detail are specific embodiments thereof with the understanding that the present disclosure is to be considered as an exemplification of the principles of the general inventive concepts. Accordingly, the general inventive concepts are not intended to be limited to the specific embodiments illustrated and described herein.

The terminology as set forth herein is for description of the embodiments only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

The exemplary powdered nutritional products of the present disclosure can comprise, consist of, or consist essentially of the essential elements of the disclosure as described herein, as well as any additional or optional element described herein or which is otherwise useful in powdered nutritional product applications.

All percentages, parts, and ratios as used herein are by weight of the total formulation, unless otherwise specified. All such weights as they pertain to listed ingredients are based on the active level and, therefore, do not include solvents or by-products that may be included in commercially available materials, unless otherwise specified.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

The phrase "nutritional product" as used herein, unless otherwise specified, refers to a substance intended to supplement a diet, or to be a component of a diet.

The phrase "powdered nutritional product" as used herein, unless otherwise specified, refers to a nutritional product in the form of finely divided solid particles that are flowable or scoopable and intended to be reconstituted with water or other aqueous liquids prior to consumption by a user.

Powdered nutritional products that contain a relatively high amount of branched-chain amino acids are typically resistant to dissolution in a liquid medium. A user will often have to spend up to 10 minutes mixing the powdered nutritional product and liquid to ensure that the powder, and in particular the branched-chain amino acids, have dissolved, or else consume the liquid with undissolved powder, which is not organoleptically favorable. In the exemplary powdered nutritional products described herein, it was unexpectedly discovered that the solubility, and thus dissolution, of branched-chain amino acids was improved by including a certain amount of a sugar alcohol in the powdered nutritional product. In particular, a weight ratio of the branched-chain amino acid to the sugar alcohol of 7:1 to 40:1 was found to be particularly effective in improving the solubility and the dissolution of the branched-chain amino acid upon reconstitution of the powdered nutritional product.

In one exemplary embodiment, a powdered nutritional product is provided. The powdered nutritional product comprises at least 15 wt. % of a branched-chain amino acid and also comprises a sugar alcohol. A weight ratio of the branched-chain amino acid to the sugar alcohol is from 7:1 to 40:1. It should be understood that the weight ratio of the branched-chain amino acid to the sugar alcohol refers to the ratio of the total weight of all branched-chain amino acids in the powdered nutritional product to the total weight of all sugar alcohols in the powdered nutritional product.

In certain embodiments, the branched-chain amino acid is at least one of leucine, isoleucine, and valine. Accordingly, certain embodiments of the powdered nutritional product comprise one or more than one of the branched-chain amino acids: leucine, isoleucine, and valine. In certain exemplary embodiments, the powdered nutritional product comprises leucine, isoleucine, and valine. The branched-chain amino acids leucine, isoleucine, and valine are essential amino acids and are often taken as supplements by athletes to improve exercise performance and reduce protein and muscle breakdown during intense exercise. Due to their chemical structure, these branched-chain amino acids are very hydrophobic.

The branched-chain amino acid in the powdered nutritional product may be provided in a variety of forms. For example, in certain embodiments, the branched-chain amino acid in the powdered nutritional product is in the form of a free amino acid, a salt, an oligopeptide, and combinations thereof. When the branched-chain amino acid is in the form of an oligopeptide, the oligopeptide comprises at least one branched-chain amino acid per oligopeptide molecule. As used herein the term "oligopeptide" refers to a dipeptide, a tripeptide, a tetrapeptide, a pentapeptide, and combinations thereof having at least one branched-chain amino acid per oligopeptide molecule.

In one exemplary embodiment, the powdered nutritional product comprises at least 15 wt. % of an oligopeptide, wherein the oligopeptide comprises at least one branched-chain amino acid per oligopeptide molecule, and a sugar alcohol. A weight ratio of the oligopeptide to the sugar alcohol is from 7:1 to 40:1. It should be understood that the weight ratio of the oligopeptide to the sugar alcohol refers to the ratio of the total weight of all oligopeptides that comprise at least one branched-chain amino acid in the powdered nutritional product to the total weight of all sugar alcohols in the powdered nutritional product. In certain embodiments, the oligopeptide comprises one or more of a dipeptide, a tripeptide, a tetrapeptide, and a pentapeptide. In certain embodiments, the oligopeptide comprises a dipeptide. Exemplary dipeptides include, but are not limited to, glycyl-leucine, alanyl-isoleucine, and valyl-glycine. In certain embodiments, the oligopeptide comprises a tripeptide. Exemplary tripeptides include, but are not limited to, glycyl-alanyl-leucine, glycyl-isoleucyl-alanine, and valyl-glycyl-alanine. In certain embodiments, the oligopeptide comprises a tetrapeptide. Exemplary tetrapeptides include, but are not limited to, glycyl-alanyl-lysine-L-leucine, glycyl-alanyl-lysine-L-isoleucine, and glycyl-alanyl-lysine-L-valine. In certain embodiments, the oligopeptide comprises a pentapeptide. Exemplary pentapeptides include, but are not limited to, glycyl-alanyl-seryl-threonyl-leucine, glycyl-glutamyl-aspartyl-prolyl-isoleucine, and arginyl-valyl-methionyl-lysyl-tyrosine.

The powdered nutritional product, according to one exemplary embodiment, comprises at least 15 wt. % of a branched-chain amino acid. In certain exemplary embodiments, the branched-chain amino acid comprises from 20 wt. % to 60 wt. % of the powdered nutritional product. In certain exemplary embodiments, the branched-chain amino acid comprises from 30 wt. % to 55 wt. % of the powdered nutritional product. In other exemplary embodiments, the branched-chain amino acid comprises from 35 wt. % to 50 wt. % of the powdered nutritional product.

According to one exemplary embodiment, the powdered nutritional product comprises at least 15 wt. % of an oligopeptide, wherein the oligopeptide comprises at least one branched-chain amino acid per oligopeptide molecule. In certain exemplary embodiments, the oligopeptide comprises from 20 wt. % to 60 wt. % of the powdered nutritional product. In certain exemplary embodiments, the oligopeptide comprises from 30 wt. % to 55 wt. % of the powdered nutritional product. In other exemplary embodiments, the oligopeptide comprises from 35 wt. % to 50 wt. % of the powdered nutritional composition.

Embodiments of the powdered nutritional product described herein comprise a sugar alcohol. In embodiments that comprise at least 15 wt. % of a branched-chain amino acid, a weight ratio of the branched-chain amino acid to the sugar alcohol is from 7:1 to 40:1, including from 10:1 to 40:1, from 15:1 to 40:1, from 20:1 to 40:1, and from 25:1 to 40:1, and also including from 7:1 to 35: 1, from 7:1 to 30:1, from 7:1 to 25:1, and from 7:1 to 20:1, and also including from 15:1 to 25:1. In certain exemplary embodiments that comprise at least 15 wt. % of a branched-chain amino acid, a weight ratio of the branched-chain amino acid to the sugar alcohol is from 10:1 to 35:1, including from 15:1 to 35:1, from 20:1 to 35:1, and from 25:1 to 35:1, and also including from 10:1 to 30:1, from 10:1 to 25:1, and from 10:1 to 20:1. In embodiments that comprise at least 15 wt. % of an oligopeptide, wherein the oligopeptide comprises at least one branched-chain amino acid per oligopeptide molecule, a weight ratio of the oligopeptide to the sugar alcohol is from 7:1 to 40:1, including from 10:1 to 40:1, from 15:1 to 40:1, from 20:1 to 40:1, and from 25:1 to 40:1, and also including from 7:1 to 35: 1, from 7:1 to 30:1, from 7:1 to 25:1, and from 7:1 to 20:1, and also including from 15:1 to 25:1. In certain exemplary embodiments that comprise at least 15 wt. % of an oligopeptide, wherein the oligopeptide comprises at least one branched-chain amino acid per oligopeptide molecule, a weight ratio of the oligopeptide to the sugar alcohol is from 10:1 to 35:1, including from 15:1 to 35:1, from 20:1 to 35:1, and from 25:1 to 35:1, and also including from 10:1 to 30:1, from 10:1 to 25:1, and from 10:1 to 20:1. Accordingly, the amount of the sugar alcohol present in the powdered nutritional product depends on the amount of branched-chain amino acids or oligopeptides present in the powdered nutritional product. For example, a powdered nutritional product that contains 35 wt. % of total branched-chain amino acids will contain from 0.875 wt. % to 5 wt. % of total sugar alcohols.

In certain exemplary embodiments, the sugar alcohol is at least one of an inositol isomer, xylitol, mannitol, sorbitol, galactitol, and erythritol. In certain exemplary embodiments, the sugar alcohol is an inositol isomer. The inositol isomer may be myo-inositol, allo-inositol, d-chiro-inositol, 1-chiro-inositol, muco-inositol, epi-inositol, scyllo-inositol, neo-inositol, cis-inositol, and combinations thereof. In certain exemplary embodiments, the sugar alcohol is myo-inositol. Without being limited to theory, it is believed that certain sugar alcohols, such as inositol isomers, have hydrophilic and hydrophobic characteristics, and that the sugar alcohols improve the dissolution of the branched-chain amino acids by interacting and binding with the branched-chain amino acids. It was discovered that powdered nutritional products comprising a sugar alcohol and at least 15 wt. % of branched-chain amino acids, wherein a weight ratio of the branched-chain amino acids to the sugar alcohols is from 7:1 to 40:1, exhibited improved solubility of the branched-chain amino acids as compared to a similar powdered nutritional product that did not comprise any sugar alcohol.

In certain exemplary embodiments, the powdered nutritional product, when reconstituted with water, exhibits improved dissolution of branched-chain amino acids after a time period of 30 seconds while being stirred at 400 revolutions per minute (rpm), as compared to the same powdered nutritional product that does not include a sugar alcohol. For example, in certain embodiments, the powdered nutritional product comprises a blend of branched-chain amino acids (leucine (50 wt. %), isoleucine (25 wt. %), and valine (25 wt. %)), and after reconstituting the powdered nutritional product with water, the dissolution of the branched-chain amino acids after a time period of 30 seconds while being stirred at 400 rpm is from 23% to 35% based on the total weight of branched-chain amino acids.

In certain exemplary embodiments, the powdered nutritional product comprises a carbohydrate. For example, certain embodiments of the powdered nutritional product may comprise from 20 wt. % to 50 wt. % of a carbohydrate, including from 25 wt. % to 45 wt. %, and also including from 30 wt. % to 40 wt. % of a carbohydrate. Exemplary carbohydrates suitable for use in the powdered nutritional product described herein include, but are not limited to, dextrose, maltodextrin, sucrose, glucose, lactose, fucose, fructose, and isomaltulose. In certain exemplary embodiments, the carbohydrate is at least one of dextrose, maltodextrin, sucrose, glucose, lactose, fucose, fructose, and isomaltulose. In certain embodiments, the maltodextrin has a dextrose equivalent (DE) value of less than or equal to 20. In certain embodiments, the maltodextrin has a DE of 1 to 10.

The powdered nutritional product, according to certain exemplary embodiments, may comprise one or more electrolytes. The electrolytes promote retention of fluids and maintenance of electrolyte balance, which is important during intense exercise. In certain exemplary embodiments, the powdered nutritional product comprises an electrolyte selected from the group consisting of sodium, potassium, calcium, chloride, magnesium, and combinations thereof. The electrolytes may be provided by a variety of sources. Exemplary sources of electrolytes include, but are not limited to, sodium chloride, potassium citrate, sodium citrate, magnesium chloride, and calcium chloride. In certain exemplary embodiments, the powdered nutritional product comprises from 1 wt. % to 10 wt. % of a source of electrolytes.

In certain exemplary embodiments, the powdered nutritional product comprises an acidulant. The acidulant may serve to increase acidity and to impart a sharp or tart taste to the powdered nutritional product upon reconstitution. The acidulant may also help mask bitter flavors imparted by the branched-chain amino acids. In certain exemplary embodiments, the powdered nutritional product comprises an acidulant selected from the group consisting of citric acid, malic acid, phosphoric acid, tartaric acid, hydrochloric acid, beta-hydroxy beta-methylbutyric acid, and combinations thereof. In certain embodiments, the powdered nutritional product comprises from 5 wt. % to 15 wt. % of an acidulant.

Certain embodiments of the powdered nutritional product may comprise one or more flavoring agents which change or enhance the flavor of the powdered nutritional product, and which may improve the hedonic or mouthfeel characteristics of the powdered nutritional product. A wide variety of flavoring agents may be used. The flavoring agents may be natural or artificial. Exemplary flavoring agents include, but are not limited to, a strawberry flavoring agent, a cherry flavoring agent, an orange flavoring agent, a pineapple flavoring agent, a grape flavoring agent, an apple flavoring agent, a lime flavoring agent, and combinations thereof. In certain exemplary embodiments, the powdered nutritional product comprises from 1 wt. % to 8 wt. % of a flavoring agent.

In certain exemplary embodiments, the powdered nutritional product may comprise one or more high-intensity sweeteners. Exemplary high-intensity sweeteners include, but are not limited to, sucralose, acesulfame potassium, saccharin, aspartame, neotame, advantame, stevia extract, steviol glycosides, monk fruit powder, monk fruit extract, mogrosides, triterpene glycosides, psicose, thaumatin, monatin, and brazzein. In certain exemplary embodiments, the powdered nutritional product comprises from 0.5 wt. % to 5 wt. % of a high-intensity sweetener.

Embodiments of the powdered nutritional product may also comprise an anti-caking agent. The anti-caking agent operates to maintain the flowability (e.g., prevent clumping) of the powdered composition over time, which provides the powdered nutritional product with a relatively long shelf-life over which the powdered nutritional product can be effectively used. Non-limiting examples of suitable anti-caking agents include calcium silicate, tricalcium phosphate, silicone dioxide, aluminum calcium silicate, magnesium silicate, tricalcium silicate, sodium aluminosilicate, sodium calcium aluminosilicate, aluminum stearate, calcium stearate, magnesium stearate, zinc stearate, calcium phosphate, magnesium phosphate, magnesium carbonate, zinc oxide, and starch. In certain exemplary embodiments, the powdered nutritional product comprises from 0.5 wt. % to 1 wt. % of an anti-caking agent. In certain exemplary embodiments, the anti-caking agent is calcium silicate.

The various embodiments of the powdered nutritional products disclosed herein, as well as other contemplated embodiments, may be prepared by any process or suitable method (now known or known in the future) for making a powdered product. Many such techniques and methods are known and can easily be applied by one of ordinary skill in the art to the various embodiments presented herein. One exemplary method includes dry blending the various components of the powdered nutritional product using a ribbon blender or a v-blender.

The powdered nutritional products are preferably in the form of finely divided solid particles that are flowable or scoopable and that may be easily scooped and measured with a spoon or similar device. In certain exemplary embodiments, the powdered nutritional product is a dry blended powder, a spray dried powder, an agglomerated powder, and combinations thereof. It is also contemplated that the powdered nutritional products may be provided in the form of a compressed tablet, wherein the particles of the powdered nutritional product are subjected to sufficient pressure to make the particles cohere.

The powdered nutritional products are intended to be reconstituted with a suitable aqueous fluid, such as water or juice, to form a liquid composition for oral consumption. The quantity of powdered nutritional product required to produce a volume suitable for one serving may vary. In certain embodiments of the powdered nutritional product, a serving may range from 3 grams to 50 grams of the powdered nutritional product, including from 10 grams to 50 grams, from 17.6 grams to 50 grams, from 25 grams to 50 grams, and from 30 grams to 50 grams. In some embodiments of the powdered nutritional product, a serving may range from 3 grams to 40 grams, from 5 grams to 35 grams, from 10 grams to 30 grams, and also including from 15 grams to 25 grams. In certain embodiments of the powdered nutritional product, a serving provides from 0.5 grams to 20 grams of branched-chain amino acids, including from 1 gram to 20 grams, from 3 grams to 15 grams, from 5 grams to 12 grams, and also including from 5 grams to 7.5 grams of branched-chain amino acids. The volume of liquid used to reconstitute an amount of the powdered nutritional product can vary. In certain exemplary embodiments, the volume of liquid used to reconstitute an amount of the powdered nutritional product is from 110 mL to 1 L, including from 236 mL to 709 mL, from 295 mL to 591 mL, and also including from 473 mL to 532 mL. In one exemplary embodiment, a serving of the powdered nutritional product is 17.6 grams, which provides 7 grams of branched-chain amino acids (3.5 grams of leucine, 1.75 grams of valine, and 1.75 grams of isoleucine), and is reconstituted with 473 mL (16 fluid ounces) of liquid (e.g., water).

The powdered nutritional product can be provided in single serving packaging (e.g., single-serve "on the go" stick packs) or multi-serving packaging, such as a re-sealable bulk container provided with a measuring scoop that may correspond to one serving of the powdered nutritional product. In some exemplary embodiments, a size of the measuring scoop corresponds to a fraction (e.g., ½, ⅓, ¼, ⅕, ⅙) of one serving of the powdered nutritional product.

The various embodiments of powdered nutritional products disclosed herein are particularly well-suited for athletes engaging in intense exercise, bodybuilding, and endurance training due to the relatively high concentration of branched-chain amino acids. The powdered nutritional products are also suitable for use as a dietary supplement to provide the user with additional branched-chain amino acids. The powdered nutritional products may help improve exercise performance and reduce protein and muscle breakdown during intense exercise. In certain exemplary embodiments, a user may consume a serving of the reconstituted powdered nutritional product before engaging in exercise, while engaging in exercise, after engaging in exercise, and combinations thereof.

EXAMPLES

The following examples illustrate certain exemplary embodiments of the powdered nutritional products described herein. The examples are given solely for the purpose of illustration and are not to be construed as limitations of the general inventive concepts, as many variations thereof are possible without departing from the spirit and scope of the general inventive concepts.

Example 1

Example 1 illustrates an exemplary powdered nutritional product in accordance with the general inventive concepts presented herein. The ingredient amounts listed in Table 1 are provided as a weight percent (wt. %) of the total powdered nutritional product, as well as in grams per 17.6 gram serving of the powdered nutritional product. For this particular embodiment, the 17.6 gram serving of the powdered nutritional product is intended to be reconstituted using 16 fluid ounces of liquid, such as water. As can be appreciated from Table 1, the powdered nutritional product comprises about 39.77 wt. % of branched-chain amino acids, and a weight ratio of the branched-chain amino acids to the sugar alcohol (here, myo-inositol) is 20:1.

TABLE 1

| Ingredient | Weight Percent (wt. %) | Grams per 17.6 Gram Serving |
| --- | --- | --- |
| Dextrose, Anhydrous | 32.39 | 5.70 |
| L-Leucine | 19.89 | 3.50 |
| L-Valine | 9.94 | 1.75 |
| L-Isoleucine | 9.94 | 1.75 |
| Citric Acid | 8.24 | 1.45 |
| Malic Acid | 5.68 | 1.00 |
| Sea Salt | 3.13 | 0.55 |
| Potassium Citrate | 3.13 | 0.55 |
| Orange Flavor | 2.56 | 0.45 |
| myo-Inositol | 1.99 | 0.35 |
| Sodium Citrate | 1.36 | 0.24 |
| Acesulfame Potassium | 0.68 | 0.12 |
| Sucralose | 0.57 | 0.10 |

TABLE 1-continued

| Ingredient | Weight Percent (wt. %) | Grams per 17.6 Gram Serving |
|---|---|---|
| Calcium Silicate | 0.51 | 0.09 |
| FD&C Yellow 6 Dye | 0.03 | 0.0055 |

Example 2

Example 2 illustrates an exemplary powdered nutritional product in accordance with the general inventive concepts presented herein. The ingredient amounts listed in Table 2 are provided as a weight percent (wt. %) of the total powdered nutritional product, as well as in grams per 10 gram serving of the powdered nutritional product. For this particular embodiment, the 10 gram serving of the powdered nutritional product is intended to be reconstituted using 16 fluid ounces of liquid, such as water. As can be appreciated from Table 2, the powdered nutritional product comprises about 50 wt. % of oligopeptides that comprise at least one branched-chain amino acid per oligopeptide molecule, and a weight ratio of the oligopeptides to the sugar alcohol (here, myo-inositol) is 10:1.

TABLE 2

| Ingredient | Weight Percent (wt. %) | Grams per 10 Gram Serving |
|---|---|---|
| Maltodextrin | 30 | 3 |
| Glycyl-Alanyl-Lysine-L-Leucine | 25 | 2.5 |
| Glycyl-Alanyl-Lysine-L-Isoleucine | 12.5 | 1.25 |
| Glycyl-Alanyl-Lysine-L-Valine | 12.5 | 1.25 |
| Citric Acid | 7.8 | 0.78 |
| myo-Inositol | 5 | 0.5 |
| Fruit Flavor | 5 | 0.5 |
| Acesulfame Potassium | 1.2 | 0.12 |
| Sucralose | 1 | 0.10 |

Example 3

Example 3 evaluates the effect that varying the myo-inositol concentration has on the aqueous dissolution of branched-chain amino acids. Two branched-chain amino acid materials were tested. The first material tested was 7.00 grams of a powdered branched-chain amino acid blend comprising 50 wt. % leucine, 25 wt. % isoleucine, and 25 wt. % valine. The second material tested was 3.5 grams of powdered leucine. Each material was tested with varying levels of powdered myo-inositol, expressed as a percentage of 17.6 grams (e.g., a serving of powdered nutritional product). For example, 1% myo-inositol is 0.176 grams, 2% myo-inositol is 0.352 grams, and so forth. The branched-chain amino acid material and the specified amount of myo-inositol were added to 16 fluid ounces of Milli-Q Plus water at 21° C. and stirred at 400 rpm. After 30 seconds and 60 seconds of stirring, an aliquot was obtained and filtered through a 0.45 μm PTFE membrane (Pall Life Sciences, Acrodisc CR 25, P/N 4501), and the filtrate of the first material was tested for valine, isoleucine, and leucine using the LC/UV method described below, while the filtrate of the second material was tested for leucine using the same LC/UV method. The test results for the first material tested are shown in Table 3, while the test results for the second material tested are shown in Table 4.

TABLE 3

| myo-Inositol (as % of 17.6 g) | Time Point (seconds) | Dissolved Valine (g per 16 oz.) | Dissolved Isoleucine (g per 16 oz.) | Dissolved Leucine (g per 16 oz.) |
|---|---|---|---|---|
| 0 | 30 | 0.401 | 0.237 | 0.596 |
| 0 | 60 | 0.730 | 0.495 | 1.21 |
| 1 | 30 | 0.432 | 0.504 | 0.860 |
| 1 | 60 | 0.690 | 0.908 | 1.51 |
| 2 | 30 | 0.550 | 0.337 | 0.747 |
| 2 | 60 | 1.01 | 0.714 | 1.53 |
| 4 | 30 | 0.564 | 0.416 | 0.729 |
| 4 | 60 | 0.924 | 0.791 | 1.36 |
| 8 | 30 | 0.797 | 0.546 | 1.09 |
| 8 | 60 | 1.29 | 0.972 | 1.94 |

TABLE 4

| myo-Inositol (as % of 17.6 g) | Time Point (seconds) | Dissolved Leucine (g per 16 oz.) |
|---|---|---|
| 0 | 30 | 0.353 |
| 0 | 60 | 0.703 |
| 1 | 30 | 0.480 |
| 1 | 60 | 1.04 |
| 2 | 30 | 0.616 |
| 2 | 60 | 1.33 |
| 4 | 30 | 0.549 |
| 4 | 60 | 1.09 |
| 8 | 30 | 0.844 |
| 8 | 60 | 1.62 |

The LC/UV system used to perform the tests comprised the following: 1) Column: YMC ODS-AQ, 4.6 x 250 mm, 5 μm, Waters P/N AQ12S052546WT; 2) Mobile Phase: Milli-Q Plus water; 3) Flow Rate: 0.4 mL/minute; 4) Temperature: 40° C.; 5) Detection: UV at 192 nm; 6) Injection: 2 μL of filtrate; and 7) Run Time: 20 minutes.

Figure 1:
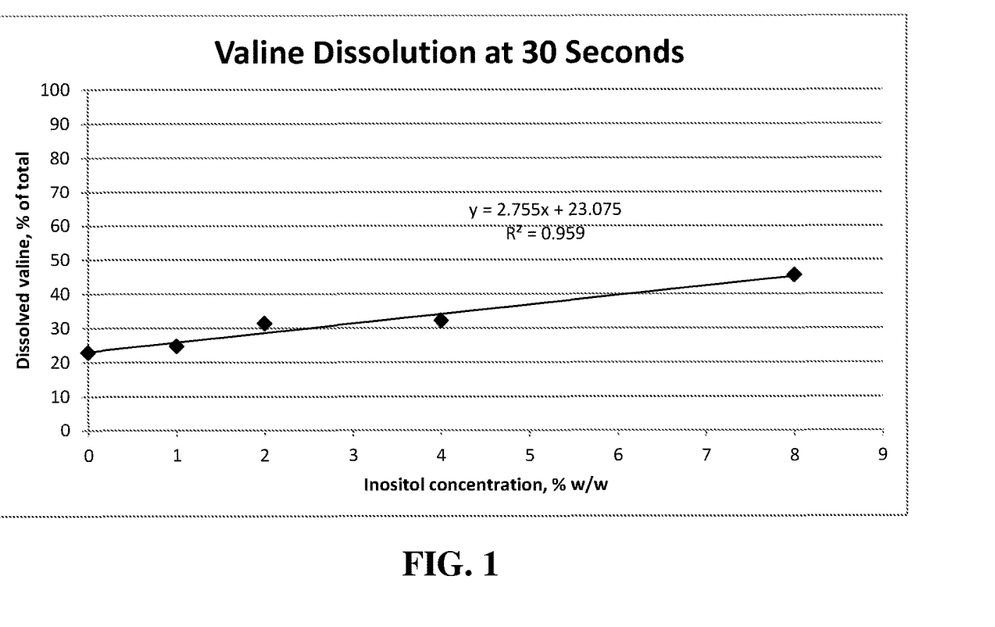
FIG. 1 is a graph showing the effect of myo-inositol concentration on valine dissolution at 30 seconds as evaluated in Example 3.
Figure 2:
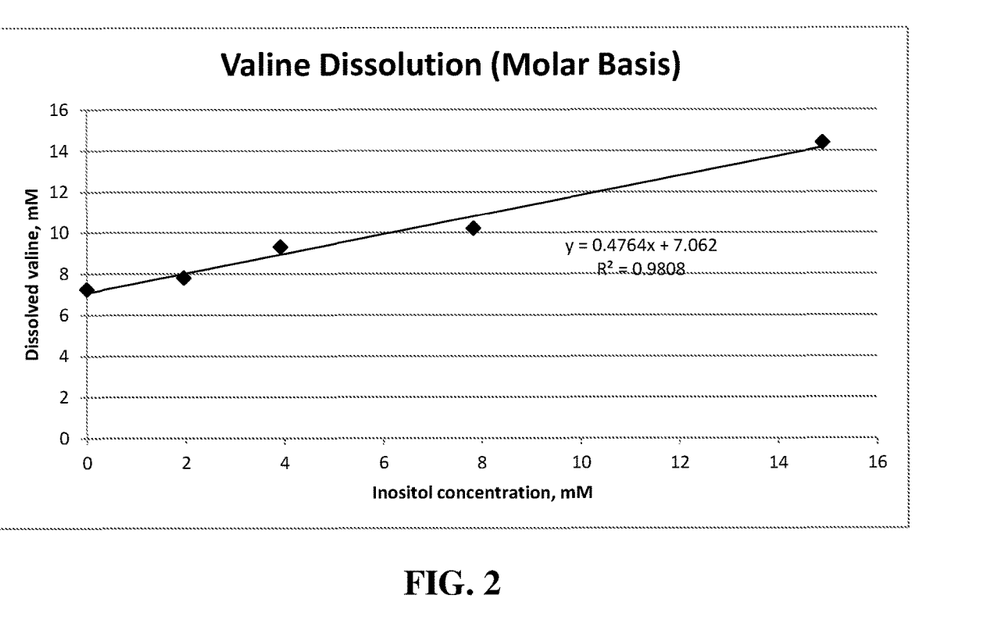
FIG. 2 is a graph showing the effect of myo-inositol concentration on valine dissolution on a molar basis at 30 seconds as evaluated in Example 3.

The data collected suggest that there are chemical interactions occurring between the branched-chain amino acids and the myo-inositol. For example, FIG. 1 shows the correlation between dissolved valine and myo-inositol concentration at the 30 second time point, which suggests a chemical interaction between the valine and myo-inositol. In FIG. 2, the valine/myo-inositol correlation is shown on a molar basis (i.e., dissolved valine as mM vs. myo-inositol as mM) at the 30 second time point. The slope of the plot of FIG. 2 suggests that one valine molecule dissolves for every two molecules of myo-inositol added.

Figure 3:
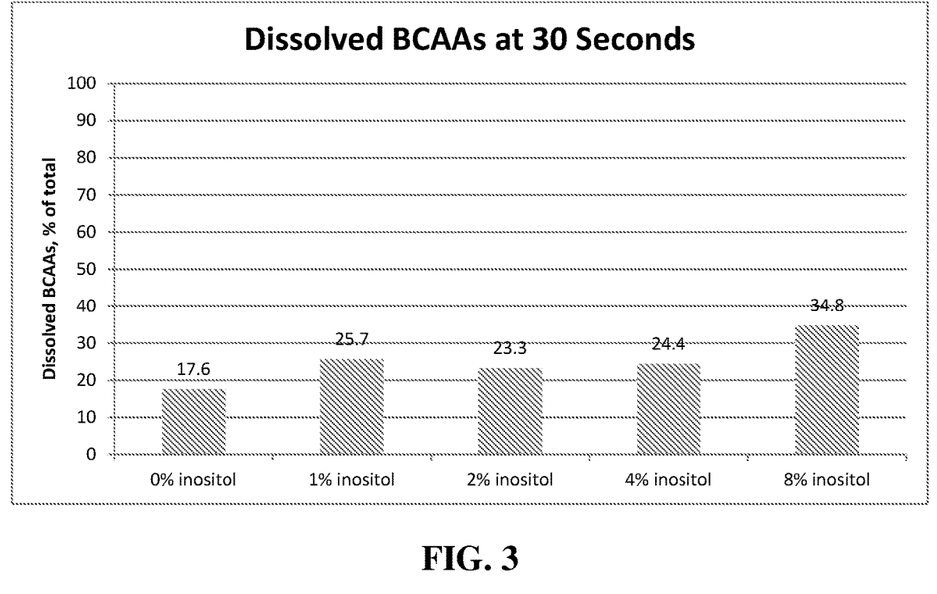
FIG. 3 is a bar graph showing the effect of myo-inositol concentration on total branched-chain amino acid dissolution at 30 seconds as evaluated in Example 3.

Referring now to FIG. 3, the branched-chain amino acid dissolution enhancing effect of myo-inositol is shown at all concentrations at the 30 second time point. As can be seen in FIG. 3, the dissolution enhancing effect is not linear, which suggests complexity in the molecular interactions.

Figure 4:
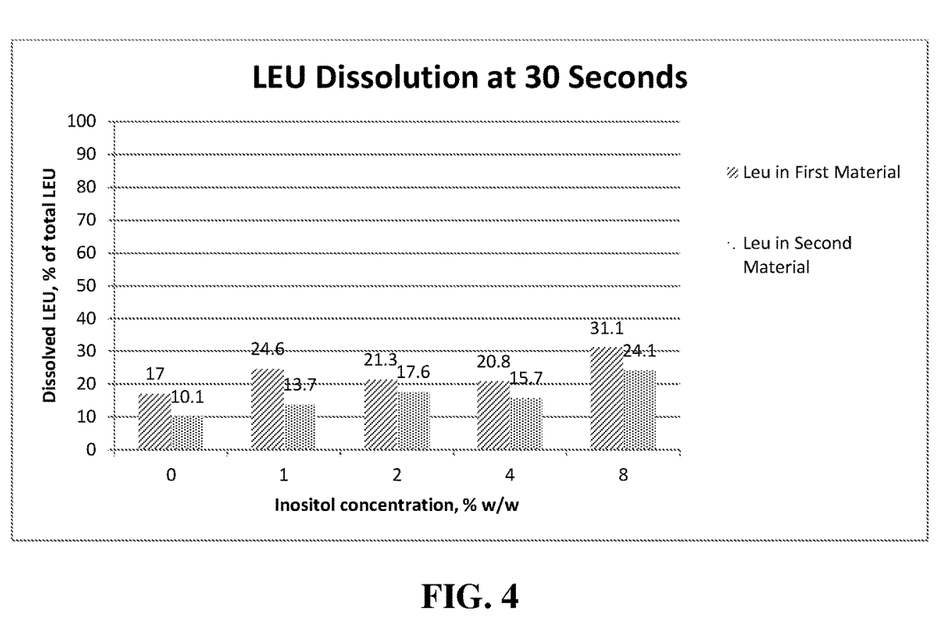
FIG. 4 is a bar graph comparing the dissolution of leucine at 30 seconds at various myo-inositol concentrations for a first material containing a branched-chain amino acid blend and a second material containing leucine only as evaluated in Example 3.

FIG. 4 is a bar graph that compares the dissolution of leucine at the 30 second time point across all myo-inositol concentrations for the first material (the branched-chain amino acid blend) and the second material (leucine only). As FIG. 4 illustrates, the dissolution rate of leucine in the first material was faster than the dissolution rate of leucine in the second material. This suggests that the additional branched-chain amino acid interactions may also facilitate leucine dissolution.

Figure 5:
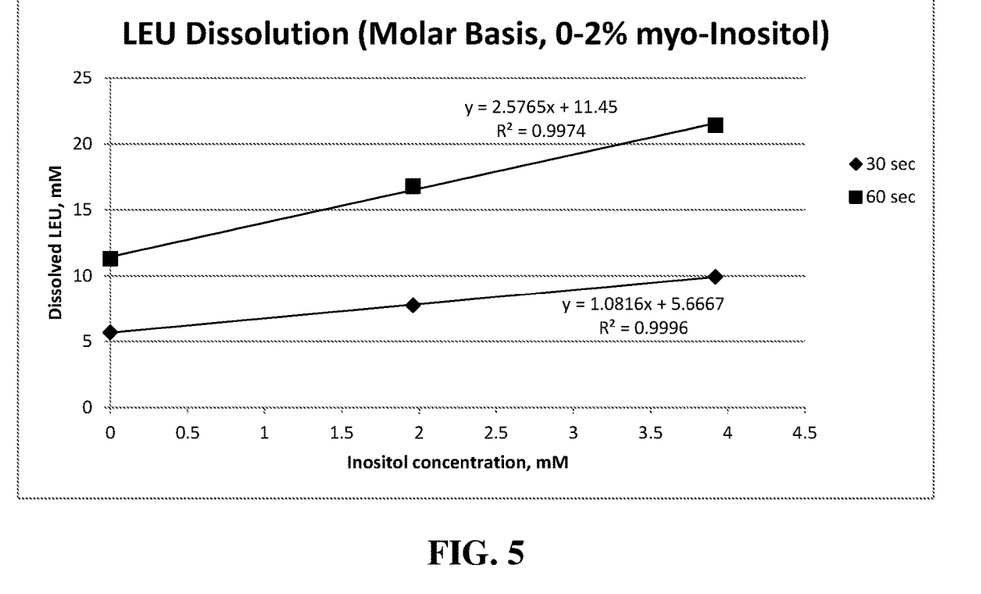
FIG. 5 is a graph showing the effect of myo-inositol concentration on leucine dissolution on a molar basis at 30 seconds and at 60 seconds as evaluated in Example 3.

Turning now to FIG. 5, a plot of leucine dissolution from the second material on a molar basis at the lower myo-inositol concentrations (0%, 1%, and 2%) at 30 seconds and at 60 seconds is shown. The strong positive correlation at both 30 seconds and at 60 seconds suggests a chemical interaction between leucine and myo-inositol. The slope of the 30-second plot (1.0816) suggests a 1:1 molecular interaction (i.e., one molecule of leucine dissolves for every molecule of myo-inositol added. The data in FIG. 5 suggests that the dissolution enhancing effect of myo-inositol begins (i.e., at 30 seconds) as a 1:1 molecular interaction (leucine to myo-inositol), but that the interactions become more complex with time (i.e., at time points≥30 seconds) and with concentration (the concentration of myo-inositol and the concentration of the branched-chain amino acids).

Example 4

Example 4 evaluates the effect that myo-inositol concentration has on the aqueous dissolution of branched-chain amino acids (valine, isoleucine, and leucine) in a powdered nutritional product. One serving (17.6 grams) of the powdered nutritional product contains 7.00 grams of a branched-chain amino acid blend comprising 50 wt. % leucine, 25 wt. % isoleucine, and 25 wt. % valine. A serving of the powdered nutritional product with a specified amount of myo-inositol was added to 16 fluid ounces of Milli-Q Plus water at 21° C. and stirred at 400 rpm. At each specified time point, an aliquot was obtained and filtered through a 0.45 μm PTFE membrane (Pall Life Sciences, Acrodisc CR 25, P/N 4501), and the filtrate was tested for valine, isoleucine, and leucine using the LC/UV method as described in Example 3. The results are shown in Table 5.

TABLE 5

| myo-Inositol (as % of 17.6 g) | Time Point (seconds) | Dissolved Valine (g per 16 oz.) | Dissolved Isoleucine (g per 16 oz.) | Dissolved Leucine (g per 16 oz.) |
| --- | --- | --- | --- | --- |
| 0 | 30 | 1.30 | 0.978 | 1.73 |
| 0 | 60 | 1.54 | 1.36 | 2.42 |
| 0 | 90 | 1.62 | 1.50 | 2.67 |
| 0 | 240 | 1.69 | 1.71 | 3.22 |
| 0 | 600 | 1.70 | 1.74 | 3.44 |
| 1 | 30 | 1.39 | 1.09 | 1.95 |
| 1 | 60 | 1.59 | 1.39 | 2.51 |
| 1 | 90 | 1.65 | 1.51 | 2.76 |
| 1 | 240 | 1.72 | 1.71 | 3.27 |
| 1 | 600 | 1.72 | 1.71 | 3.40 |
| 2 | 30 | 1.38 | 1.07 | 1.91 |
| 2 | 60 | 1.55 | 1.33 | 2.36 |
| 2 | 90 | 1.63 | 1.46 | 2.67 |
| 2 | 240 | 1.70 | 1.66 | 3.25 |
| 2 | 600 | 1.70 | 1.70 | 3.45 |
| 4 | 30 | 1.44 | 1.14 | 2.02 |
| 4 | 60 | 1.57 | 1.39 | 2.47 |
| 4 | 90 | 1.64 | 1.52 | 2.72 |
| 4 | 240 | 1.70 | 1.70 | 3.23 |
| 4 | 600 | 1.70 | 1.72 | 3.38 |
| 8 | 30 | 1.36 | 1.09 | 1.94 |
| 8 | 60 | 1.56 | 1.38 | 2.45 |
| 8 | 90 | 1.62 | 1.48 | 2.66 |
| 8 | 240 | 1.69 | 1.72 | 3.30 |
| 8 | 600 | 1.69 | 1.74 | 3.48 |

As can be appreciated from the data presented in Table 5, the addition of myo-inositol enhanced the rate of dissolution of the branched-chain amino acids in the powdered nutritional product. This was particularly evident at the 30 second time point across all concentrations of myo-inositol.

Example 5

Example 5 evaluates the effect of seven (7) inositol isomers on the dissolution of the branched-chain amino acid L-leucine. In this example, 3.50 grams of L-leucine, without or with 0.1 grams of an inositol isomer, was added to 16 fluid ounces of Milli-Q water at 21° C., which was being stirred at 400 rpm. Aliquots were taken at 30 seconds and at 60 seconds after L-leucine addition and were filtered through a 0.45 μm PTFE membrane (Pall Life Sciences, Acrodisc CR 25, P/N 4501), and the filtrates were tested for L-leucine by the LC/UV method described in Example 3. The results are shown in Table 6.

TABLE 6

| Inositol Isomer (0.1 g/16 oz.) | Leu dissolved at 30 seconds (g/16 oz.) | Leu dissolved at 60 seconds (g/16 oz.) | Leu dissolved at 60 seconds (% of total Leu) |
| --- | --- | --- | --- |
| None (n = 3) | 0.422 ± 0.018 | 0.828 ± 0.036 | 23.7 ± 1.0 |
| myo-inositol[a] | 0.465 | 0.838 | 23.9 |
| myo-inositol[a] | 0.495 | 0.781 | 22.3 |
| scyllo-inositol | 0.450 | 0.841 | 24.0 |
| L-chiro-inositol | 0.472 | 0.848 | 24.2 |
| allo-inositol | 0.792 | 1.41 | 40.4 |
| cis-inositol | 0.649 | 1.27 | 36.3 |
| epi-inositol (n = 3) | 0.626 ± 0.223 | 1.16 ± 0.37 | 33.2 ± 10.6 |
| muco-inositol | 0.379 | 0.751 | 21.5 |

[a]The two myo-inositol isomers used were obtained from different commercial sources.

As the data in Table 6 reveals, the addition of an inositol isomer generally increased the dissolution of L-leucine, particularly at the 30 second time point. In addition, the dissolution rate of L-leucine was most enhanced by the allo-inositol isomer, the cis-inositol isomer, and the epi-inositol isomer. The enhancement of the L-leucine dissolution rate by the allo-, cis-, and epi-inositol isomers appears to be attributable to a common structural feature: four adjacent accessible carbons (i.e., carbons relatively free of hydroxyl hindrance).

While the present application has been illustrated by the description of various exemplary embodiments, and while these embodiments have been described in considerable detail, it is not the intention of the Applicant to restrict or in any way limit the scope of the appended claims to such detail. Additional advantages and modifications will readily appear to those skilled in the art. Therefore, the application, in its broader aspects, is not limited to the specific details, the representative compositions and processes, and illustrative examples shown and described. Accordingly, departures may be made from such details without departing from the spirit or scope of the general inventive concepts.

What is claimed is:

1. A powdered nutritional product comprising:
   at least 15 wt. % of a branched-chain amino acid; and
   a sugar alcohol;
   wherein a weight ratio of the branched-chain amino acid to the sugar alcohol is from 7:1 to 40:1; and
   wherein the powdered nutritional product exhibits improved dissolution of the branched-chain amino acid when 17.6 g of the powdered nutritional product is mixed with 16 fluid ounces of water at 21° C. and stirred at 400 rpm for 30 seconds, as compared with a comparative powdered nutritional product that is the same as the powdered nutritional product except that the comparative powdered nutritional product does not include the sugar alcohol.

2. The powdered nutritional product of claim 1, wherein the weight ratio of the branched-chain amino acid to the sugar alcohol is from 10:1 to 30:1.

3. The powdered nutritional product of claim 1, wherein the sugar alcohol is at least one of an inositol isomer, xylitol, mannitol, sorbitol, galactitol, and erythritol.

4. A powdered nutritional product comprising:
at least 15 wt. % of a branched-chain amino acid; and myo-inositol;
wherein a weight ratio of the branched-chain amino acid to the myo-inositol is from 7:1 to 40:1; and
wherein the powdered nutritional product exhibits improved dissolution of the branched-chain amino acid when 17.6 g of the powdered nutritional product is mixed with 16 fluid ounces of water at 21° C. and stirred at 400 rpm for 30 seconds, as compared with a comparative powdered nutritional product that is the same as the powdered nutritional product except that the comparative powdered nutritional product does not include the myo-inositol.

5. The powdered nutritional product of claim 1, wherein the branched-chain amino acid is at least one of leucine, isoleucine, and valine.

6. The powdered nutritional product of claim 1, wherein the branched-chain amino acid comprises leucine, isoleucine, and valine.

7. The powdered nutritional product of claim 1, wherein the branched-chain amino acid is in the form of a free amino acid, a salt, an oligopeptide, or a combination thereof.

8. The powdered nutritional product of claim 7, wherein the branched-chain amino acid is in the form of an oligopeptide, and wherein the oligopeptide comprises at least one branched-chain amino acid per oligopeptide molecule.

9. The powdered nutritional product of claim 1, further comprising from 20 wt. % to 50 wt. % of a carbohydrate.

10. The powdered nutritional product of claim 9, wherein the carbohydrate is at least one of dextrose, maltodextrin, sucrose, glucose, lactose, fucose, fructose, and isomaltulose.

11. The powdered nutritional product of claim 1, further comprising an electrolyte selected from the group consisting of sodium, potassium, calcium, chloride, magnesium, and combinations thereof.

12. The powdered nutritional product of claim 1, further comprising an acidulant selected from the group consisting of citric acid, malic acid, phosphoric acid, tartaric acid, hydrochloric acid, beta-hydroxy beta-methylbutyric acid, and combinations thereof.

13. The powdered nutritional product of claim 1, wherein the branched-chain amino acid comprises from 20 wt. % to 60 wt. % of the powdered nutritional product.

14. The powdered nutritional product of claim 1, wherein the branched-chain amino acid comprises from 30 wt. % to 55 wt. % of the powdered nutritional product.

15. A powdered nutritional product comprising:
at least 15 wt. % of an oligopeptide, wherein the oligopeptide comprises at least one branched-chain amino acid per oligopeptide molecule; and
a sugar alcohol;
wherein a weight ratio of the oligopeptide to the sugar alcohol is from 7:1 to 40:1; and
wherein the powdered nutritional product exhibits improved dissolution of the branched-chain amino acid when 17.6 g of the powdered nutritional product is mixed with 16 fluid ounces of water at 21° C. and stirred at 400 rpm for 30 seconds, as compared with a comparative powdered nutritional product that is the same as the powdered nutritional product except that the comparative powdered nutritional product does not include the sugar alcohol.

16. The powdered nutritional product of claim 15, wherein the sugar alcohol is at least one of an inositol isomer, xylitol, mannitol, sorbitol, galactitol, and erythritol.

17. The powdered nutritional product of claim 15, wherein the sugar alcohol is myo-inositol.

18. The powdered nutritional product of claim 15, wherein the oligopeptide comprises a dipeptide.

19. The powdered nutritional product of claim 15, wherein the oligopeptide comprises a tripeptide.

20. The powdered nutritional product of claim 15, wherein the oligopeptide comprises a tetrapeptide.

21. The powdered nutritional product of claim 15, wherein the oligopeptide comprises a pentapeptide.

22. The powdered nutritional product of claim 15, further comprising from 20 wt. % to 50 wt. % of a carbohydrate.

23. The powdered nutritional product of claim 22, wherein the carbohydrate is at least one of dextrose, maltodextrin, sucrose, glucose, lactose, fucose, fructose, and isomaltulose.

24. The powdered nutritional product of claim 15, further comprising an acidulant selected from the group consisting of citric acid, malic acid, phosphoric acid, tartaric acid, hydrochloric acid, beta-hydroxy beta-methylbutyric acid, and combinations thereof.

25. The powdered nutritional product of claim 15, wherein the oligopeptide comprises from 20 wt. % to 60 wt. % of the powdered nutritional product.

26. The powdered nutritional product of claim 15, wherein the oligopeptide comprises from 30 wt. % to 55 wt. % of the powdered nutritional product.

27. A powdered nutritional product comprising:
15 wt. % to 60 wt. % of a branched-chain amino acid or an oligopeptide comprising at least one branched-chain amino acid per oligopeptide molecule; and
a sugar alcohol;
wherein a weight ratio of the branched-chain amino acid or oligopeptide to the sugar alcohol is from 10:1 to 40:1; and
wherein the powdered nutritional product exhibits improved dissolution of the branched-chain amino acid or oligopeptide when 17.6 g of the powdered nutritional product is mixed with 16 fluid ounces of water at 21° C. and stirred at 400 rpm for 30 seconds, as compared with a comparative powdered nutritional product that is the same as the powdered nutritional product except that the comparative powdered nutritional product does not include the sugar alcohol.

28. The powdered nutritional product of claim 27, wherein the sugar alcohol is at least one of an inositol isomer, xylitol, mannitol, sorbitol, galactitol, and erythritol.

29. The powdered nutritional product of claim 27, wherein the sugar alcohol is myo-inositol.

30. The powdered nutritional product of claim 27, further comprising from 20 wt. % to 50 wt. % of a carbohydrate.

* * * * *